(12) United States Patent
Finck et al.

(10) Patent No.: US 6,367,531 B1
(45) Date of Patent: Apr. 9, 2002

(54) METHOD AND DEVICE FOR THE MANUFACTURE OF A RIM PREFORM

(75) Inventors: Francois Finck, Clermont-Ferrand; Yves Vernet, Cournon-D'Auvergne, both of (FR)

(73) Assignee: Compagnie Générale des Etablissements Michelin - Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/384,167

(22) Filed: Aug. 27, 1999

Related U.S. Application Data

(62) Division of application No. 08/966,901, filed on Nov. 10, 1997, now Pat. No. 5,985,072.

(30) Foreign Application Priority Data

Nov. 15, 1996 (FR) .............................................. 96/14055

(51) Int. Cl.$^7$ .............................................. B32B 31/00
(52) U.S. Cl. ...................... 156/391; 156/425; 156/447; 156/457; 156/475; 156/499; 156/74; 156/173; 156/183; 156/185; 156/189; 156/195; 156/311
(58) Field of Search ................................ 156/425, 447, 156/457, 468, 475, 499, 74, 391, 185, 189, 195, 309.9, 311, 184, 173, 169, 183

(56) References Cited

U.S. PATENT DOCUMENTS

| | | | | |
|---|---|---|---|---|
| 3,140,968 A | * | 7/1964 | Barrios et al. | 156/192 |
| 4,273,601 A | | 6/1981 | Weingart | 156/189 |
| 4,294,490 A | | 10/1981 | Woelfel | 301/64.7 |
| 4,749,235 A | | 6/1988 | McDougall | 301/64.7 |
| 4,774,043 A | | 9/1988 | Beckman | 264/134 |
| 4,779,347 A | | 10/1988 | Nathoo et al. | 33/1 R |
| 5,073,315 A | | 12/1991 | Bertelson | 264/490 |

FOREIGN PATENT DOCUMENTS

FR 2595621 9/1987

OTHER PUBLICATIONS

Patent Abstracts of japan, publication No. 63068401, Application No. 61211891 of Mitsubishi Rayon Co. Ltd., Publication Date Mar. 28, 1988.

* cited by examiner

*Primary Examiner*—Linda Gray
(74) *Attorney, Agent, or Firm*—Baker Botts L.L.P.

(57) ABSTRACT

A process for the manufacture of a rim preform or rim-element having an axis of revolution by the placing on a preforming matrix pre-assembled fibers along two orientations defining deformable meshes. A winding of a strip of fibers is fastened on a circumference of the preforming matrix with asymmetrical orientation of the fibers, whereupon it is applied progressively until covering the entire surface of the preforming matrix by subjecting it to tensions of substantially circumferential orientation.

8 Claims, 5 Drawing Sheets

METHOD AND DEVICE FOR THE MANUFACTURE OF A RIM PREFORM

This is a division of application Ser. No. 08/966,901 filed Nov. 10, 1997, now U.S. Pat. No. 5,985,072.

BACKGROUND OF THE INVENTION

The present invention relates to the manufacture of reinforced structures for parts of composite material, and more particularly for wheels, rims or rim elements.

Numerous methods exist for producing wheels or rims of composite material. Mention may be made, in particular, of high-precision injection molding of reinforced thermoplastic resins or of compression molding of thermosetting resins which are also reinforced.

These techniques require the use of staple fibers, which result in average mechanical properties of the finished products as well as their difficult mechanical optimization due to the displacements of the reinforcement fibers during the molding.

If it is desired to use continuous fibers, one can select an existing fabric. More industrially, one can also select the method of manufacturing composite parts known as R.T.M. (resin transfer molding) or any derivative process. In this process, the reinforcement materials, such as glass fibers, carbon fibers or fibers of any other type, are prearranged in the cavity of a mold. These reinforcement materials thus form the "preform" of the final composite part. This operation of putting in place and structuring the reinforcements is known as "preforming". The resin is then transferred through the preform into the mold under vacuum and/or with a transfer pressure, and then cross-linked at suitable temperatures.

In the case of industrial manufacture, in order to optimize the use of the injection molds, the preforms can be prepared outside the injection mold. In this case the preforms are frequently made rigid, for instance by a thermoplastic binder, in order to facilitate their positioning in the injection molds.

The production of the preform is a critical step in the R.T.M. process, particularly for complex shapes having strong concavities, as is true in the case of tire nms.

French Patent 2595621 proposes manufacturing a preform of revolution for a part of composite material by placing a fibrous texture with deformable meshes, whether woven or plaited, on a preforming matrix having a shape similar to that of the structure to be produced, so as to fit the shape of the preforming matrix by auto-adaptation of the meshes. The process consists in placing the fibrous texture on the preforming matrix at an axial end of said preforming matrix, with the meshes having sides of opposite inclination with respect to the axial direction of the structure, and then gradually placing the fibrous texture on the preforming matrix in the direction towards the other end, while subjecting the texture to a tension in this axial direction.

This process leads to a symmetrical orientation of the reinforcement fibers of a fabric relative to the axial direction of the structure, which is not suitable in the case of tire rims, for which it is desirable to obtain a circumferential and axial orientation of the reinforcement fibers.

European Patent Application EP 0327173 presents a solution for the production of preforms of composite wheels by winding continuous fibers axially and then circumferentially. However, this process is slow and requires large and expensive equipment.

SUMMARY OF THE INVENTION

The object of the present invention is to present another, simple technique for the production of a rim preform from preassembled fibers. A structure of preassembled fibers can be a woven fabric, for example. Such a fabric is formed of warp threads and filling threads assembled by weaving.

In order to produce a preform with such a fabric, the use is to apply the warp and filling fibers in the desired directions of mechanical reinforcement, in this case the axial and circumferential direction. Under these conditions, the direct application of the fabric to a surface having long concavities, such as a rim, results in the appearance of wrinkles: the preforming cannot be realized.

The invention is a method for the production of a rim preform or rim-element preform having an axis of revolution by placing preassembled fibers along two directions defining deformable meshes on a preforming matrix in which:
  a strip of said preassembled fibers is wound around a form of revolution in order to obtain a winding having a given number of layers of preassembled fibers;
  said winding is fastened on a circumference of larger diameter of the preforming matrix so that the fibers are disposed, relative to the axial orientation, along a first orientation of angle alpha and a second orientation of angle beta which is smaller than alpha; and
  applying said winding progressively until it covers the entire surface of the preforming matrix by subjecting it to tensions of substantially circumferential orientation and of a direction such that said tensions tend to increase said angle alpha.

The angle alpha of inclination of the first reinforcement fibers of the strip of the fabric is preferably between sixty-five and eighty-five degrees.

The method for the manufacture of a rim preform in accordance with the invention has the advantage of leading to orientations of the reinforcement fibers of the preform which are close to the axial and circumferential directions of the structure.

Preferably, after having applied the winding of the strip over the entire preforming matrix, this winding is compacted against the preforming matrix by the application of a radial pressure. This step has the advantage of increasing the content of reinforcement fibers in the finished composite part, which improves its mechanical properties.

Another object of the invention is a device for the manufacture of a rim preform or rim-element preform comprising:
  a preforming matrix of outer profile of revolution corresponding to the inner profile of said preform;
  means for fastening a winding of a strip of preassembled fibers along two orientations defining deformable meshes on a circumference of larger diameter of said preforming matrix;
  means for applying said winding by subjecting it to tensions in a substantially circumferential direction.

The means for applying the winding advantageously comprise:
  an application shoe having an application surface which is intended to come into contact with the winding over a given sector, said application surface having an entrance zone with an axial entrance profile the minimum diameter of which is at least greater than the larger outside diameter of said preform, an outlet zone with an axial outlet profile corresponding to the final outside profile of said preform, and a zone of transition having an axial profile developing progressively circumferentially from said entrance axial profile towards said axial outlet profile;

means for the holding and placing into relative rotation of the preforming matrix and said application shoe; and means for applying said application shoe against said sector of said winding.

In a preferred embodiment, the circumferential development of a circumferential profile of the transition zone of the application surface of the shoe is all the faster the closer said circumferential profile is axially close to the circumference of larger diameter where the winding is to be initially attached.

DESCRIPTION OF THE DRAWINGS

One embodiment of the invention will now be described by way of illustration and not of limitation, with reference to the following accompanying drawings.

DESCRIPTION OF PREFERRED EMBODIMENTS

Figure 1:
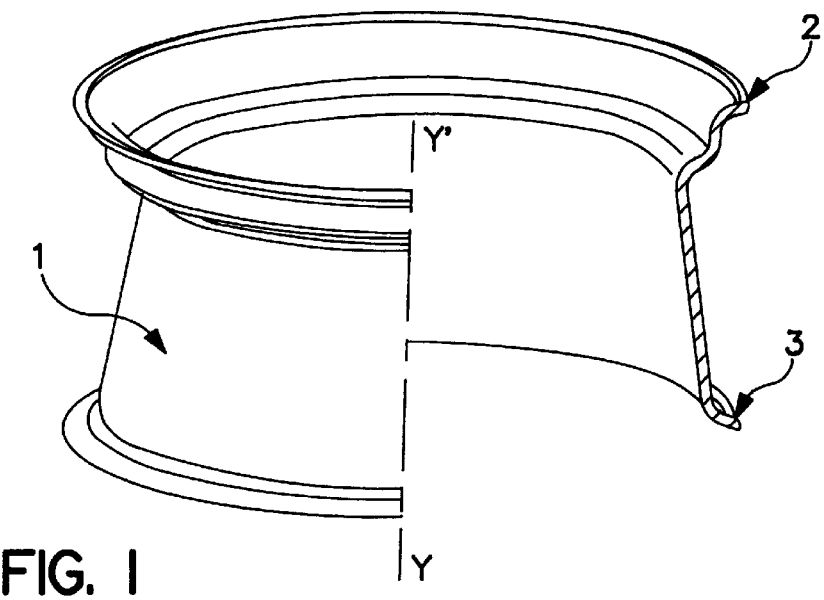
FIG. 1 shows a rim preform.

The rim preform 1 shown in FIG. 1 is formed of several superimposed layers of fabric with their warp and filling fibers arranged substantially along axial and circumferential directions as will be seen below. This preform has an axis of revolution YY'. Its two axial ends are the front flange 2 and rear flange 3.

The difficulty in producing such a rim preform 1 is due to the large variations in length of the radii in its cross section.

Figure 2:
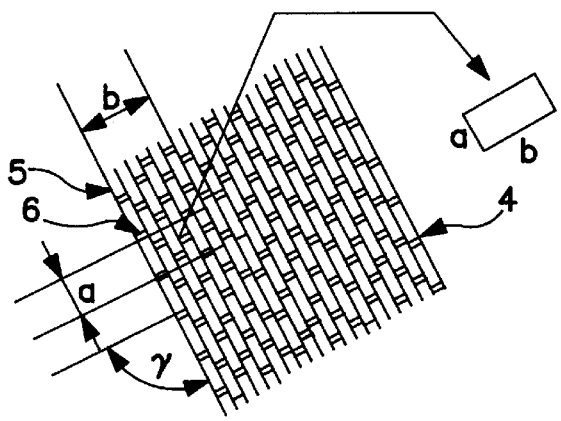
FIG. 2 shows a reinforcement fabric.
Figure 3:
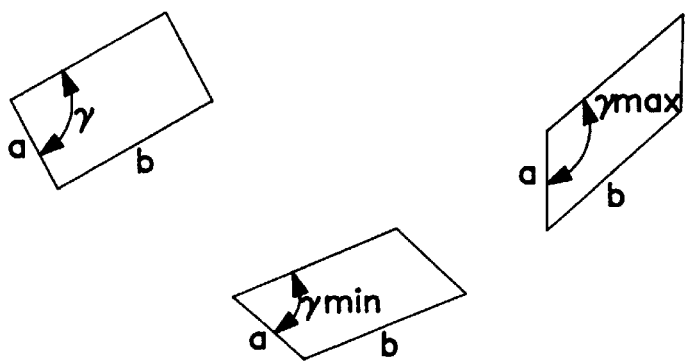
FIG. 3 illustrates the deformability of a fabric such as that of FIG. 2.

An example of fabric 4 intended to produce a preform 1 is shown in FIG. 2. This fabric 4 is formed of filling fibers 5 and warp fibers 6 which form an angle y with each other. Such a fabric 4 can be considered to be formed of unit meshes of sides a and b. These lengths a and b correspond to the distance between two filling fibers 5 and warp fibers 6 placed in the same weaving configuration. When the fabric 4 is pulled in a direction different from that of the filling fibers 5 and warp fibers 6, each unit mesh of the fabric 4 is deformed to form a parallelogram; the lengths a and b remain constant, but the angle γ changes. The maximum and minimum limits of y can be measured experimentally: $\gamma_{max}$ and $\gamma_{min}$ (FIG. 3). The fabrics used in the method of the invention are preferably γ angles on the order of 90 degrees. Fabrics having values of γ ranging by ±30 degrees from 90 degrees can also be used.

Figure 4:
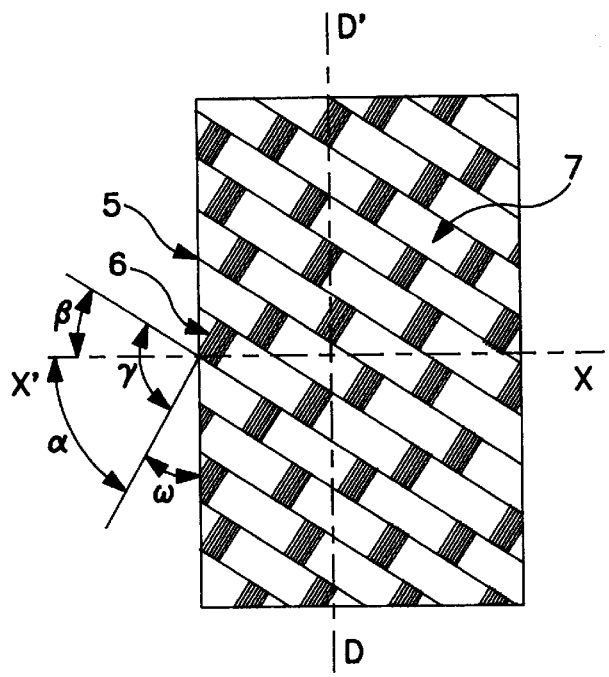
FIG. 4 shows a strip of fabric.

What is referred to as a "strip" is a s trip of fabric 4 formed of fibers oriented in angles alpha and beta relative to the width of the strip and cut to a width corresponding to a given rim. FIG. 4 shows such a strip 7 ready to be applied to a preforming matrix. This strip 7 is obtained by cutting a fabric 4 on the bias relative to the S directions of the warp threads 6 and filling threads 5 of the fabric 4. In the case of FIG. 4, the cutting is effected with a bias corresponding to an angle ω equal to $\pi/2-\alpha$ relative to the direction of the warp threads 6 of the fabric 4. This angle ω is preferably between and 10 and 25 degrees.

When wound on the preforming matrix, the axis D'D corresponds to the circumferential direction and the axis X'X corresponds to the axial direction.

This cut can also be effected on the bias relative to the filling threads.

The first step in the production of a preform consists in winding this strip 7 on a body of revolution, for instance a cylindrical shell, until obtaining a given number of layers of fibers. The outside diameter of this cylindrical shell is preferably identical to the larger diameter of the preforming matrix 8 (see FIG. 5), but th is is not necessary. When the diameter of this shell differs from that of the matrix 8, it can be brought to that of the matrix 8 by radial extension (increase in the diameter of the winding) or axial extension (decrease in the diameter of the winding). This intermediate step may be useful in order to modify the angles of orientation of the preassembled fibers.

Figure 5:
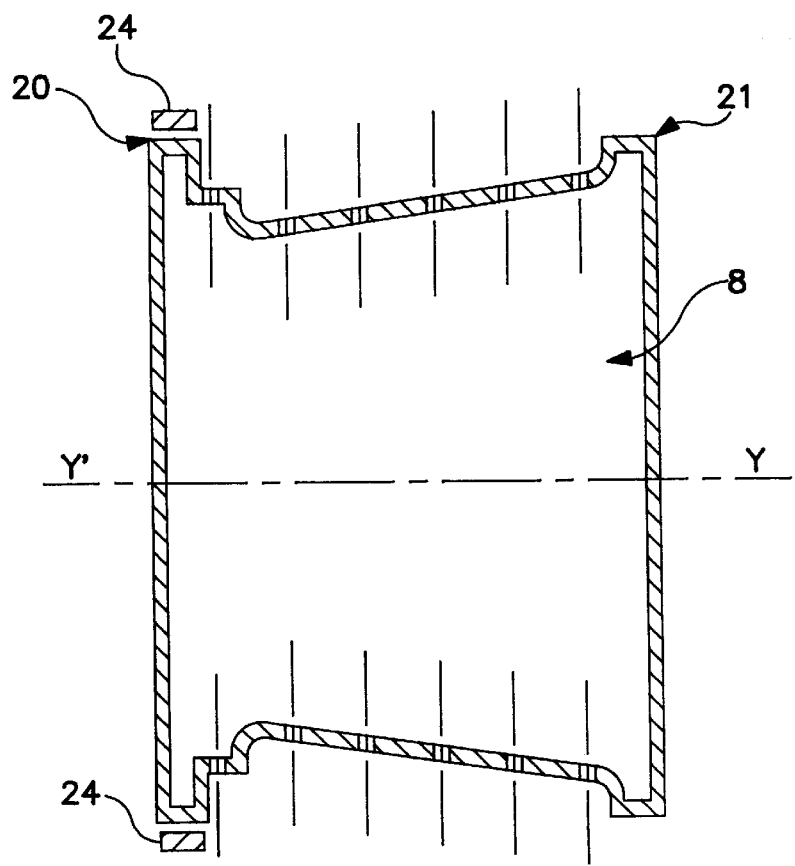
FIG. 5 shows a preforming matrix.

FIG. 5 shows a preforming matrix 8. This matrix 8 also has an axis of revolution YY' and a radially outer profile corresponding to the inner profile of the preform 1 to be produced. Its axial ends 20 and 21 correspond to the front flange 2 and rear flange 3 of the preform 1. These axial ends have the larger outside diameters. Accordingly, it is on one of these ends, for instance the end 20, that the winding is initially to be fastened circumferentially by means, for instance, of a hoop 24.

Figure 6:
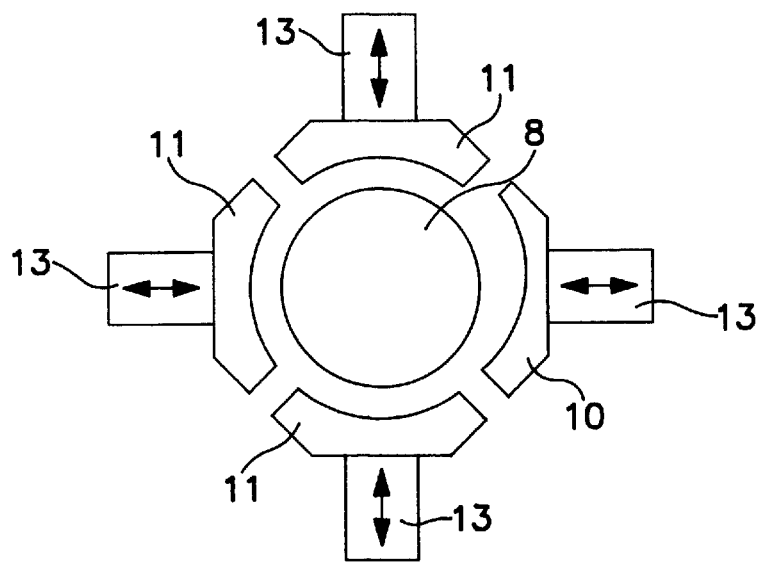
FIG. 6 is a diagram illustrating an application device.
Figure 7:
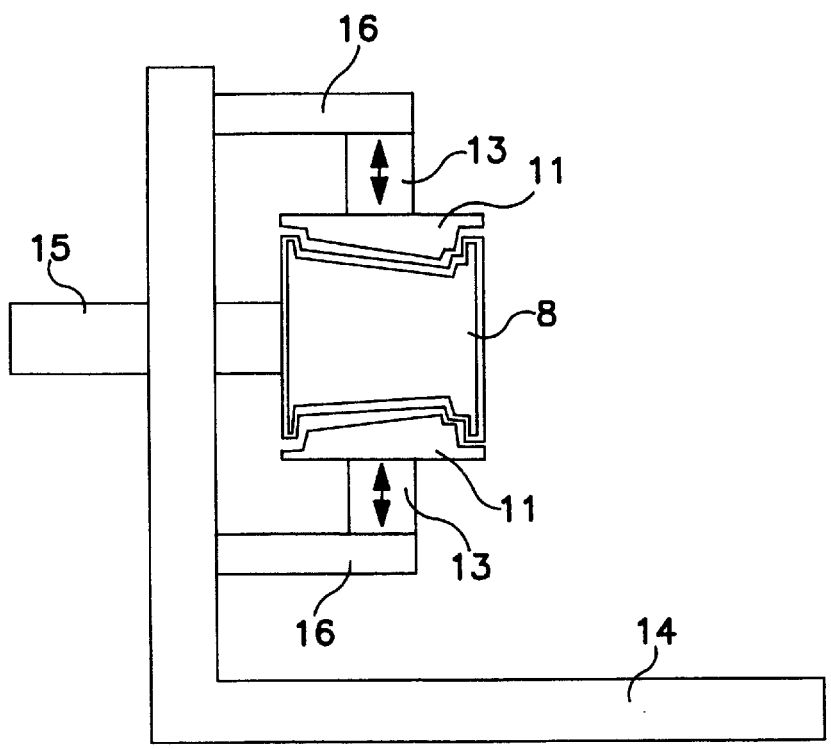
FIG. 7 is a side view of the application device of FIG. 6.

A device for applying a winding on a preforming matrix 8 is shown diagrammatically in FIGS. 6 and 7. FIG. 6 is a front view of a preforming matrix 8, an application shoe 10, and three compacting shoes 11. The application shoe 10 and compacting shoes 11 are held by cylinder-piston units 13 and can also move radially so as to come against a corresponding sector of the rim preform 1. The preforming matrix 8 is fastened to a frame 14 and can be driven in rotation by a motor 15. The cylinder-piston units 13 are fastened to the frame 14 by the supports 16. In order to facilitate the removal of the preforms after their manufacture, the preforming matrix 8 can advantageously be formed of two parts which can be separated in the circumferential plane of minimum diameter.

As can be noted from FIG. 7, the compacting shoes 11 have a surface of application against the preform 1 the axial profile of which surface corresponds to the outer axial profile of the preform 1 to be produced.

Figures 8, 9A, 9B, 9C:
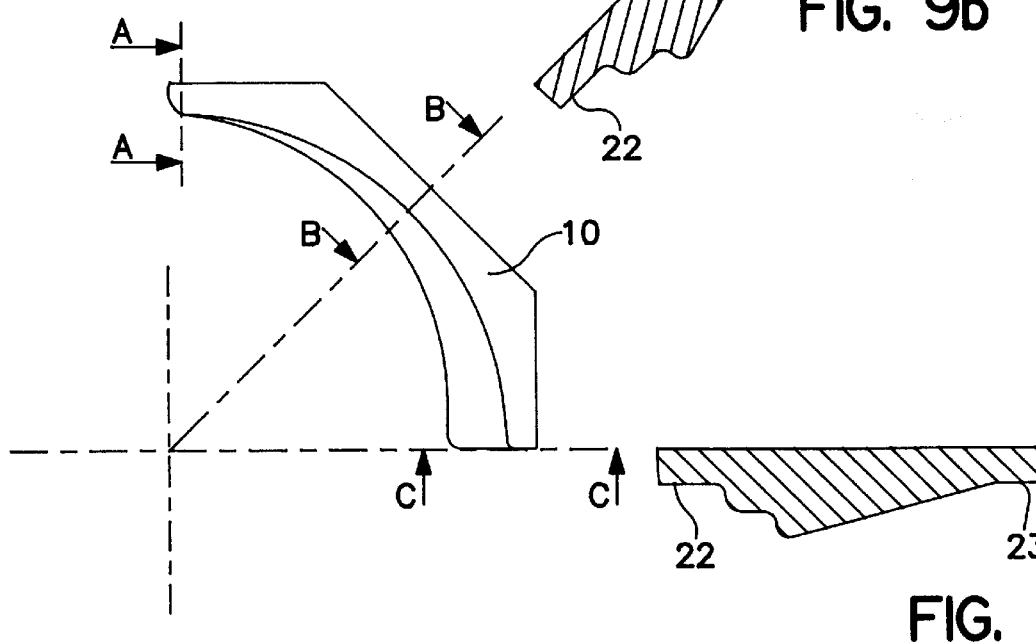
FIG. 8 is a side view of an application shoe.
FIGS. 9(a), (b) and (c) are three cross sections through the application shoe of FIG. 8.

FIG. 8 is a side view of the application shoe 10. This shoe 10 has circumferentially three zones, namely an entrance zone, a transition zone and an outlet zone. FIG. 9 shows three cross sections through the application shoe 10 corresponding to the lines AA, BB and CC respectively as indicated in FIG. 8, in which the reference numerals 22 and 23 indicate the zones intended to come against the corresponding zones 20 and 21 of the preforming matrix 8. FIG. 9(a) is a cross section through the entrance zone along the section AA of FIG. 8;. the axial profile of the application surface in this zone has a diameter greater than or equal to the larger outside diameter of the preform 1 to be produced. FIG. 9(c) is a cross section through the outlet zone along the line CC of FIG. 8. This cross section has an axial profile corresponding to the final outer profile of the preform 1. Finally, FIG. 9(b) is a cross section through the transition zone along the line BB as indicated in FIG. 8. In this case, the axial profile is intermediate between that of the entrance zone and that of the outlet zone. It is noted that the profile on the side of the axial end 20 is already that of the outlet profile while on the other side the transition is not complete. Therefore, the development of the axial profile of the application surface of the shoe 10 in the transition zone is faster the closer one approaches the axial end 20 where the winding is initially attached.

The process in accordance with the invention is as follows:

- wind a strip 7 around a shell of an outside diameter equal to that of the axial ends 20, 21 of the matrix 8 in order to obtain the number of layers of fabric necessary for the preform 1 to be produced;
- the application shoe 10 and compacting shoes 11 being in a position radially spaced from the preforming matrix 8, fasten the winding of the strip 7 to one axial end of the preforming matrix 8, for instance the end 20, by means of a hoop;
- place the preforming matrix in rotation around the axis YY' in a direction such that every point of said matrix moves against the application surface of the shoe 10 from the entrance zone towards the outlet zone;
- radially displace the application shoe 10 so that it comes against the winding of the strip 7 until obtaining the final thickness of the preform 1;
- displace the compacting shoes radially until they come against the winding of the strip at the same final thickness;
- stop the rotation of the preforming matrix;
- remove the finished preform.

It is the frictional forces of circumferential orientation between the application shoe 10 and the outer layer of the winding which produce a progressive sliding of the fibers of the different layers relative to the fibers locked at the level of the axial end 20 of the preforming matrix 8 until locked in position applied against the preforming matrix 8. In order that these frictional forces are actually circumferential, it is important that the speeds of rotation of the matrix 8 and of advance of the application shoe 10 be synchronized. In fact, it is necessary that when the shoe 10 comes against the winding, a minimum number of turns has taken place. This number of turns must necessarily be greater than or equal to 1, but in order to have proper application, it can be about ten. The speed of rotation of the matrix is not a critical parameter, and a speed of a few revolutions per second is entirely satisfactory.

The orientation a of the warp fibers 6 relative to the axial direction is preferably, for conventional structures of preassembled fibers, initially between 65 and 80 degrees, which corresponds to values of ω of between 10 and 25 degrees.

In order that the method can be applied, it is necessary that the fibers along the substantially circumferential orientation, for instance the warp threads, be wound helically on the preforming matrix and that the threads have one end fastened to one of the rim flange and the other end free at the other flange. It is therefore impossible to have an application with a value of alpha of 90 degrees. On the other hand, with very deformable fabrics, for instance with an imbalance of 90/10 between warp and filling, it is possible to apply the warp fibers with values of alpha very close to 90 degrees, for instance 85 degrees.

The radial movement of the application shoe 10 towards the winding of the strip 7 creates circumferential frictional forces which tend to increase the angle a of the filling fibers or to bring these fibers together in the circumferential direction. These forces produce a progressive circumferential displacement of the layers of the winding of the strip 7 until the winding adapts itself to the profile of the preforming matrix 8. The circumferentially and axially progressive development of the profiles of the zone of transition of the application shoe 10 permits a positioning of the winding of the strip 7 which is also progressive.

At the end of the stroke of the application shoe 10, the compacting shoes are brought up radially in order to stabilize the preform 1 in the desired shape.

Figure 10:
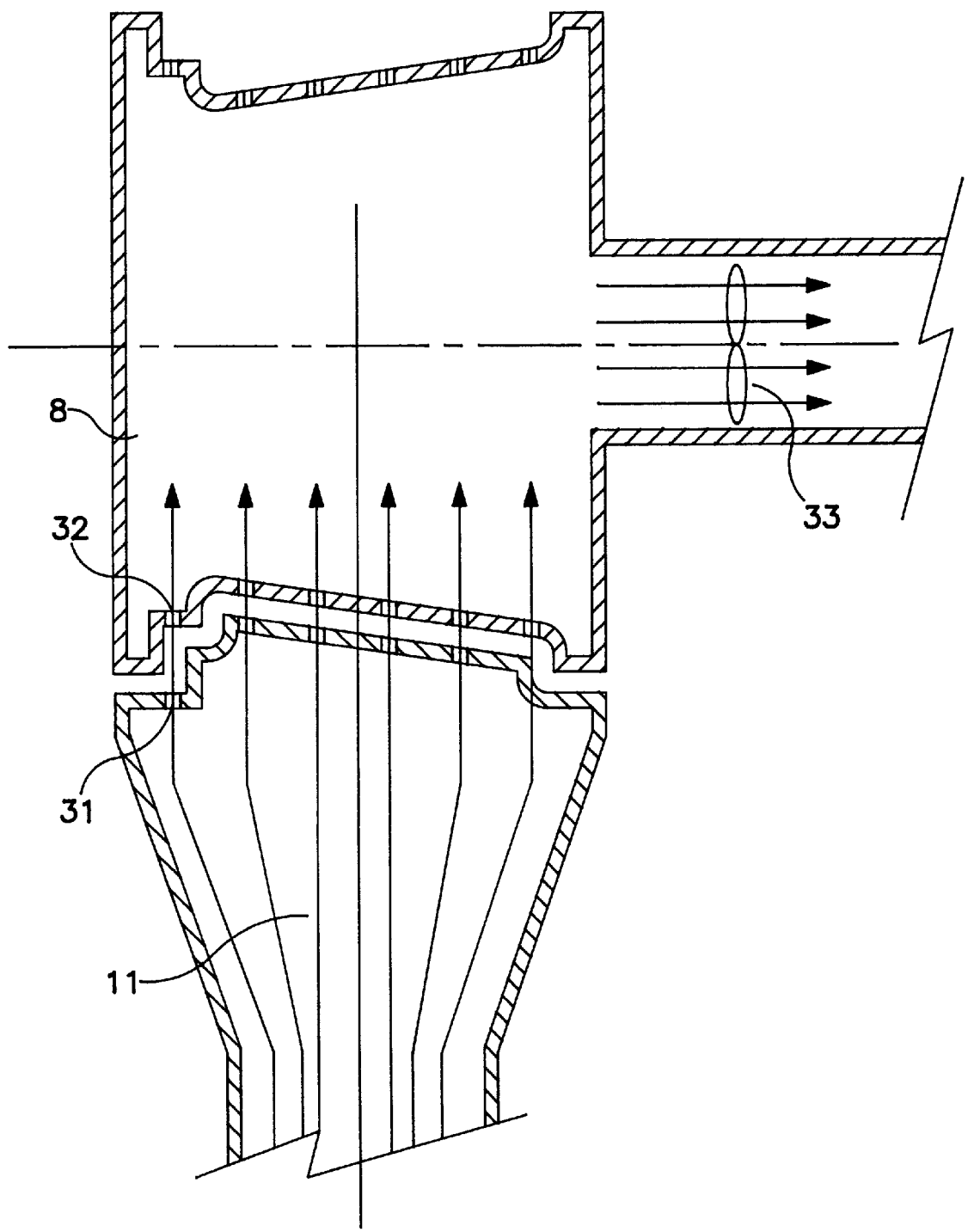
FIG. 10 illustrates an improvement in the application device.

In order to facilitate the stabilization, it is advantageous to supplement the application device by incorporating in it means for the heating and cooling of the preforming matrix 8. These means may, in particular, comprise a source of hot air which is connected at least to one compacting shoe 11, as is shown in FIG. 10. This shoe is hollow and has radial holes 31. Corresponding radial holes 32 are also uniformly drilled in the preforming matrix 8. The flow of hot air passes through the space present between the shoe and the preforming matrix, in which space the winding of the strip 7 is contained. This flow is then discharged into a channel 33 located in the axis of the preforming matrix 8.

The fabrics used must then comprise a thermoplastic preforming binder. After having put the winding of the strip 7 in place on the preforming matrix, a flow of hot air is caused to pass through the winding, this flow causing the thermoplastic binding to melt. The winding is then applied as previously against the preforming matrix while the binder is melted. When the application has been completed the flow of hot air is replaced by a flow of cold air in order to cool the preform 1, solidify the preforming binder, and thus stabilize the preform produced. The preform can then easily be handled without being deformed.

In accordance with a variant of the process in accordance with the invention, the winding of the strip 7 of fabric around the preforming matrix 8 and its application to said matrix 8 by means of the shoe 10 are effected simultaneously.

In the event that the thicknesses of the preform to be produced are substantial, the application of the strip can also be effected in several successive operations.

Three examples of the carrying out of the process of the invention will now be described, using as fabric a 2×2 twill of "Les Fils d'Auguste Chomarat et Cie", France, Item No. AF43.0391, the extreme gamma values of which are 53 and 129 degrees respectively. The rim preform corresponds to a 6J15 rim. The fiber used is glass.

Table 1 below shows the results of the angles $\alpha$, $\beta$ and $\gamma$ measured after the manufacture of the rim preform as a function of the initial values of $\alpha$.

TABLE 1

| Initial α/β (degrees) | 70/20 | 75/15 | 80/10 |
|---|---|---|---|
| Original gamma | 90 | 90 | 90 |
| Minimum gamma | 68 | 55 | 40 |
| Maximum gamma | 105 | 90 | 90 |
| Variation in gamma | 37 | 35 | 50 |
| Original alpha | 60 | 75 | 80 |
| Minimum alpha | 60 | 75 | 70 |
| Maximum alpha | 70 | 80 | 80 |
| Variation in alpha | 10 | 5 | 10 |
| Original beta | 30 | 15 | 10 |
| Minimum beta | 0 | −20 | −40 |
| Maximum beta | 30 | 15 | 10 |
| Variation in beta | 30 | 35 | 50 |

It is noted that in the three cases the variation in orientation of the warp fibers is very slight; these fibers therefore remain substantially in their original orientation. On the other hand, the filling fibers show a strong variation related to the adaptation of the fabric to the strong variations in diameter of the preform. In the third case alone, the measurements made seem to indicate that excessively large deformations have been imposed upon the fabric (measured values $\gamma_{min}$ less than the limit of deformability of the fabric). This has been able to result in certain very local difficulties in application.

As has already been stated, in the case of wheel rims, it is desirable to favor the orientation of the reinforcement fibers which is as circumferential as possible in order to optimize the mechanical strength of the rims in operation. Furthermore, it is advisable to have some fibers in a quasi-axial orientation in order to obtain good mechanical resistance to bursting under pressure.

The process of the invention makes it possible to obtain this substantially circumferential orientation of the filling fibers. One can also use a fabric the warp/filling ratio of which is imbalanced up to proportions of 10% filling to 90% warp and thus favor the circumferential reinforcement. Another variant for obtaining an imbalanced fabric consists in introducing a given proportion of carbon or aramid fibers in the warp in a glass fabric.

The preforms being thus produced, it remains, if necessary, to cut out the ends of the front and rear flanges in order to assure an excellent geometry and then to place them in a closed mold, inject a thermosetting resin under vacuum or slight pressure, and cross-link it in order to obtain a finished rim.

The process of the invention has been described in connection with the production of wheel-rim preforms for automotive vehicles. It can also be used for the production of preforms of parts of composite material having an axis of revolution, in which the orientation of the reinforcement fibers in axial and circumferential directions is substantial.

We claim:

1. A device for manufacturing a preform of a part of composite material having an axis of revolution comprising:
    a preforming matrix having an outer profile of revolution corresponding to the inner profile of said preform;
    means for fastening on a larger circumference of said preforming matrix a winding of a given number of layers of fibers preassembled along two orientations defining deformable meshes;
    means for applying said winding to said matrix by subjecting it to tensions in a substantially circumferential direction.

2. A device according to claim 1, in which the means for applying said winding comprise:
    an application shoe having an application surface intended to come into contact with the winding on a given sector, said application surface having an entrance zone with an axial entrance profile the minimum diameter of which is at least greater than the larger outside diameter of said preform, an outlet zone having an axial outlet profile corresponding to the final outside profile of said preform and a transition zone having an axial profile which develops progressively circumferentially from said axial entrance profile towards said axial outlet profile;
    means for the holding and placing in relative rotation of the preforming matrix and of said application shoe; and
    means for applying said application shoe against said sector of said winding.

3. A device according to claim 2, in which the circumferential development of a circumferential profile of the transition zone of the application surface of the shoe is faster the closer the said circumferential profile is axially to the circumference of the larger diameter where the winding is to be initially fastened.

4. A device according to claim 1, furthermore comprising compacting means comprising at least one compacting shoe, the surface of application of which against the winding has a geometry corresponding to the outside profile of said preform, and means for applying said compacting shoe against the outer surface of said winding.

5. A device according to claim 1, furthermore comprising means for the heating and cooling of said preforming matrix.

6. A device according to claim 4, furthermore comprising means for the heating and cooling of the preforming matrix which includes means for driving hot or cold air through at least one of the application and compacting shoes and the preforming matrix, passing through radial holes provided for this purpose in said shoe and said preforming matrix.

7. A device according to claim 1, in which said part of composite material is a rim or a rim element.

8. A device as set forth in claim 1 in which the means for applying the winding and subjecting it to tensions in a substantially circumferential direction include pressing means engageable against the strip from the portion fixed on the larger circumference of the preforming matrix across the entire surface of the preforming matrix while the pressing means and preforming matrix are displaced relative to each other.

* * * * *